(12) United States Patent
Shinozaki

(10) Patent No.: US 7,562,097 B2
(45) Date of Patent: Jul. 14, 2009

(54) DATA EDITING APPARATUS AND DATA EDITING PROGRAM

(75) Inventor: Wataru Shinozaki, Hachioji (JP)

(73) Assignee: Olympus Corporation, Tokyo (JP)

( * ) Notice: Subject to any disclaimer, the term of this patent is extended or adjusted under 35 U.S.C. 154(b) by 571 days.

(21) Appl. No.: 10/678,516

(22) Filed: Oct. 2, 2003

(65) Prior Publication Data

US 2004/0143601 A1 Jul. 22, 2004

(30) Foreign Application Priority Data

Oct. 9, 2002 (JP) ............................. 2002-296602

(51) Int. Cl.
G06F 7/00 (2006.01)
(52) U.S. Cl. ........................ 707/104.1; 707/102; 386/4; 386/52; 715/201
(58) Field of Classification Search ............. 707/104.1, 707/102; 386/4, 52; 715/201
See application file for complete search history.

(56) References Cited

U.S. PATENT DOCUMENTS

| | | | | |
|---|---|---|---|---|
| 5,262,877 | A | * | 11/1993 | Otsuka ........................ 386/54 |
| 5,966,122 | A | * | 10/1999 | Itoh ............................ 715/838 |
| 6,154,601 | A | * | 11/2000 | Yaegashi et al. .............. 386/52 |
| 6,282,330 | B1 | | 8/2001 | Yokota et al. ................ 382/309 |
| 6,334,025 | B1 | * | 12/2001 | Yamagami ................... 386/96 |
| 6,335,742 | B1 | * | 1/2002 | Takemoto .................... 715/781 |
| 6,526,215 | B2 | * | 2/2003 | Hirai et al. ................... 386/52 |
| 6,640,044 | B2 | * | 10/2003 | Greenwood et al. ............ 386/52 |
| 6,658,527 | B1 | | 12/2003 | Hiroyasu ..................... 711/112 |
| 6,674,955 | B2 | | 1/2004 | Matsui et al. |
| 6,738,075 | B1 | | 5/2004 | Torres et al. |
| 6,774,939 | B1 | * | 8/2004 | Peng ........................ 348/231.4 |
| 6,778,760 | B1 | | 8/2004 | Kagle .......................... 386/96 |
| 6,928,613 | B1 | * | 8/2005 | Ishii et al. .................... 715/726 |
| 6,938,215 | B2 | | 8/2005 | Kobayashi et al. |
| 6,976,229 | B1 | | 12/2005 | Balabanovic et al. |
| 7,103,842 | B2 | | 9/2006 | Masuda et al. |
| 7,239,348 | B2 | * | 7/2007 | Miyazaki ................. 348/231.4 |

(Continued)

FOREIGN PATENT DOCUMENTS

JP 01-102791 A 4/1989

(Continued)

OTHER PUBLICATIONS

Adobe Premiere 6.1 User Guide, 2000, Chapter 3: Editing Video, p. 163-235, accessed online at <www.gatv.ssr.upm.es/~ltav/practicas/Premiere.pdf> on Feb. 20, 2008.*

*Primary Examiner*—Charles Rones
*Assistant Examiner*—Phuong-Thao Cao
(74) *Attorney, Agent, or Firm*—Frishauf, Holtz, Goodman & Chick, P.C.

(57) ABSTRACT

According to the present invention, a data editing apparatus includes: a first folder to store audio data and image data, which is linked with the audio data at a predetermined playback position thereof; a second folder to store only image data without storing any audio data; a link release control unit for releasing a link between arbitrary audio data and image data linked therewith stored in the first folder; and a movement control unit for moving image data, of which link information is canceled, from the first folder to the second folder when the link is released through the link release control unit.

6 Claims, 7 Drawing Sheets

U.S. PATENT DOCUMENTS

| | | | |
|---|---|---|---|
| 2001/0008572 A1* | 7/2001 | Ohmori et al. | 386/52 |
| 2001/0033741 A1* | 10/2001 | Miyashita | 386/117 |
| 2002/0033889 A1 | 3/2002 | Miyazaki | 348/232 |
| 2002/0036694 A1 | 3/2002 | Merril | 348/220.1 |
| 2002/0054102 A1 | 5/2002 | Nozaki | |
| 2002/0057457 A1* | 5/2002 | Nozaki et al. | 358/1.18 |
| 2002/0112112 A1* | 8/2002 | Yoshida | 711/1 |
| 2003/0011687 A1* | 1/2003 | Imura et al. | 348/231.2 |
| 2003/0018777 A1* | 1/2003 | Miller et al. | 709/223 |
| 2003/0055905 A1* | 3/2003 | Nishiyama et al. | 709/206 |
| 2003/0167287 A1* | 9/2003 | Forster | 707/203 |
| 2003/0206723 A1 | 11/2003 | Ando et al. | 386/96 |
| 2004/0001631 A1* | 1/2004 | Camara et al. | 382/224 |
| 2004/0027369 A1 | 2/2004 | Kellock et al. | |
| 2004/0111436 A1 | 6/2004 | Nagai et al. | 707/104.1 |
| 2004/0167783 A1 | 8/2004 | Nagai | 704/270 |

FOREIGN PATENT DOCUMENTS

| | | |
|---|---|---|
| JP | 6-251079 A | 9/1994 |
| JP | 08-077680 A | 3/1996 |
| JP | 09-247607 A | 9/1997 |
| JP | 11-069290 A | 3/1999 |
| JP | 11-215461 A | 8/1999 |
| JP | 2001-069453 A | 3/2001 |
| JP | 2001-218160 A | 8/2001 |

* cited by examiner

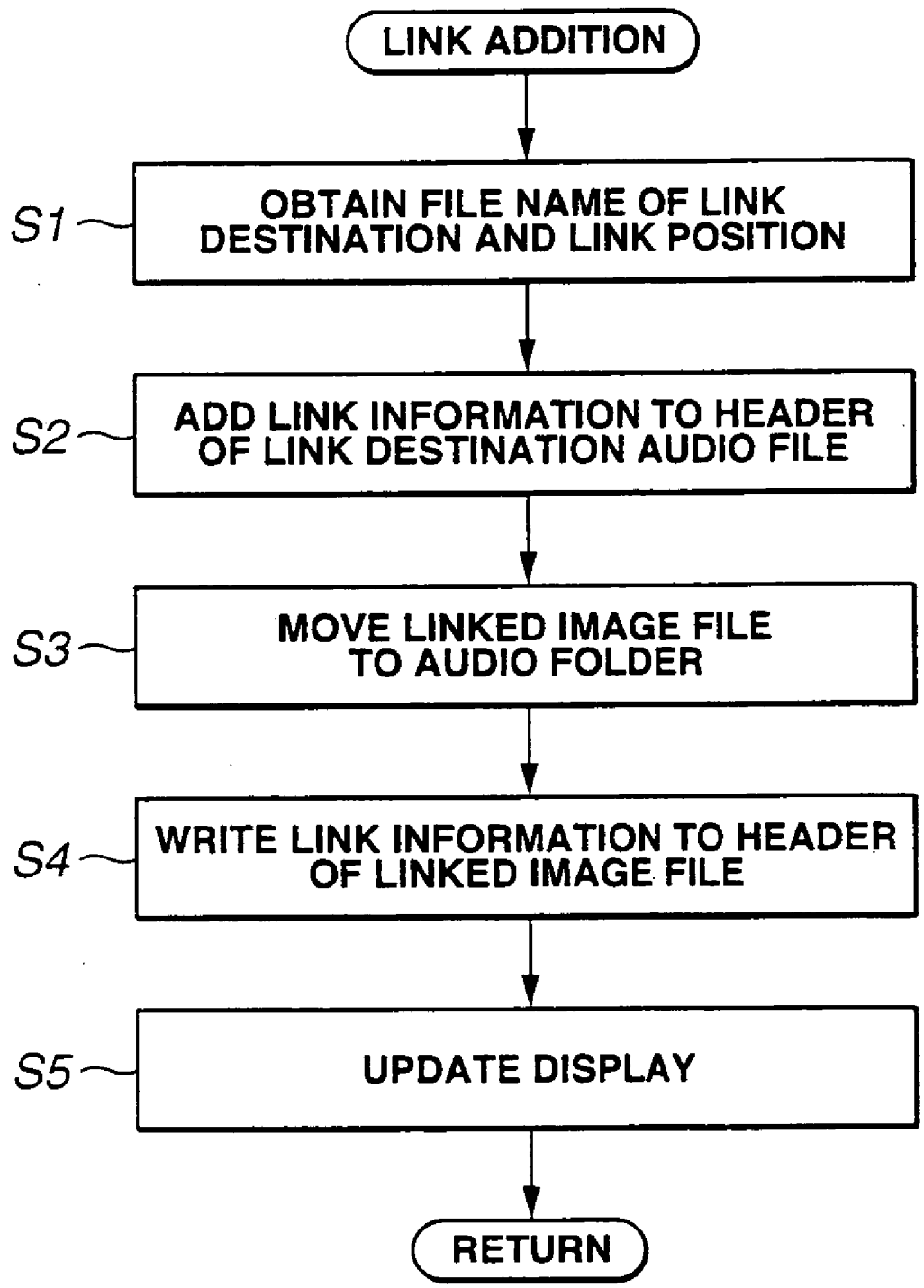

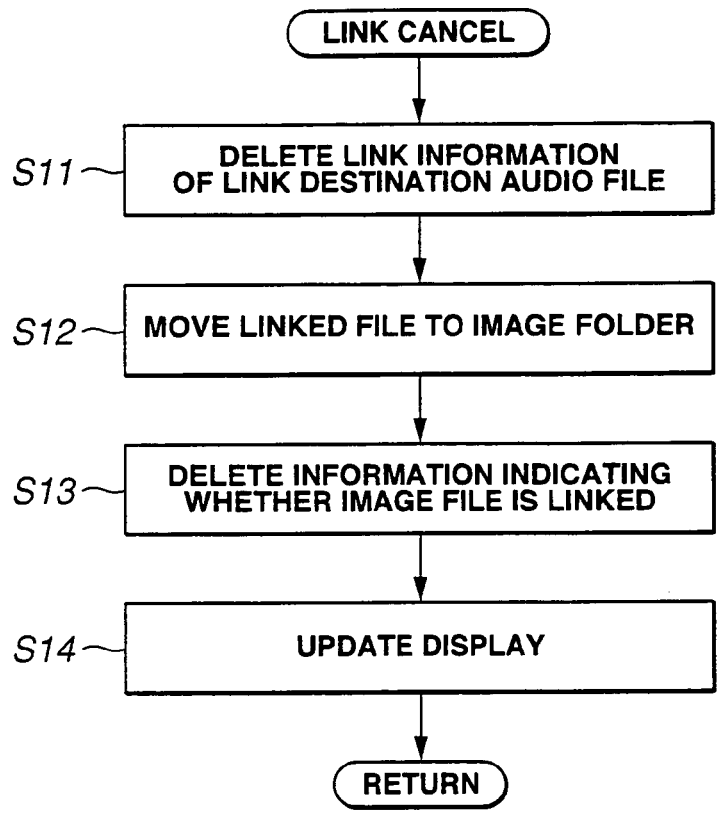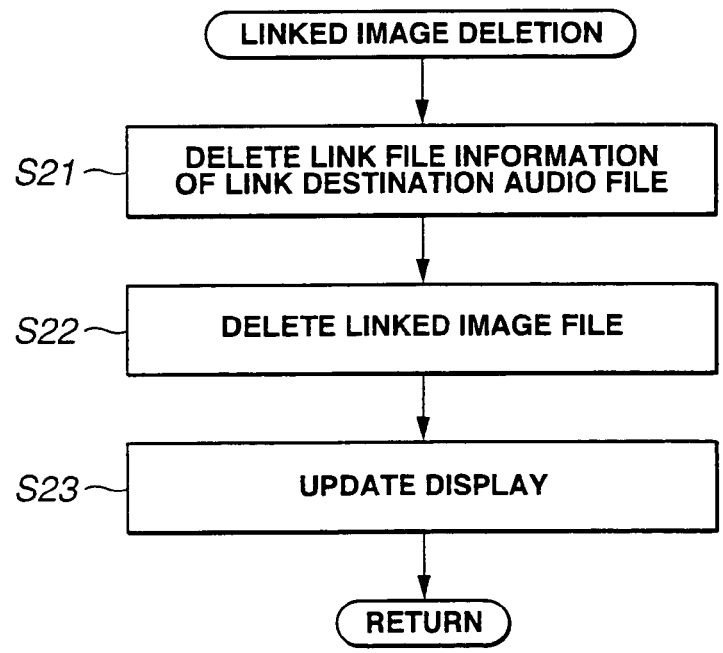

DATA EDITING APPARATUS AND DATA EDITING PROGRAM

CROSS-REFERENCE TO RELATED APPLICATION

This application claims benefits of Japanese Application No. 2002-296602 filed in Japan on Oct. 9, 2002, the entire contents of which are incorporated herein by reference.

BACKGROUND OF THE INVENTION

1. Field of the Invention

The present invention relates to a data editing apparatus and program. Particularly, the invention relates to a data editing apparatus which allows an audio and image recording apparatus, which is capable of recording audio data and image data, to transfer audio data and image data obtained through the audio and image recording apparatus to the data editing apparatus itself, stores the received data therein, and edits the stored data, and the invention relates to a data editing program to realize a function of editing link information between the audio data and the image data stored in the data editing apparatus.

2. Related Art Statement

Various audio and image recording apparatuses capable of recording image data and audio data in a predetermined recording medium and playing back the audio data simultaneously with the playback of arbitrary recorded image data have been proposed. For example, Japanese Unexamined Patent Application Publication No. 6-251079 discloses such an apparatus.

Japanese Unexamined Patent Application Publication No. 6-251079 discloses an image and audio file apparatus which is constructed based on a concept that image data is mainly handled. In the apparatus, arbitrary audio data is linked with image data.

On the other hand, recently, various audio and image recording apparatuses of another type are in practical use. This type of audio and image recording apparatus is formed by constructing a recording apparatus, based on a concept that recording of audio data is mainly performed, so that image data can be recorded. The apparatus of this type is constructed so as to link obtained image data with audio data.

As mentioned above, in recent years, small audio and image recording apparatuses capable of obtaining sound and still pictures or moving pictures as electronic data and recording the obtained audio data and image data in a predetermined recording medium such as a semiconductor memory, for example, portable digital recorders, are in common and practical use.

Recently, the performance of a small information processing apparatus capable of dealing with audio data and image data, which are obtained through the above-mentioned audio and image recording apparatus, namely, the performance of a personal computer (hereinbelow, simply referred to as a computer) is being increased remarkably.

Various means for connecting the above-mentioned audio and image recording apparatus to the computer to process sound and images as electronic data are being proposed and are also put into practical use.

In other words, if the following arrangement is realized, it is convenient: The audio and image recording apparatus and the computer are electrically connected to each other through a predetermined cable. While both the apparatuses are being connected to each other, the apparatuses communicate with each other to transfer predetermined audio data and image data, which are obtained through the audio and image recording apparatus, to the computer. Then, the computer performs various editing operations on the transferred data.

In this instance, for the editing operations in the computer after the reception of the data, obtained by the audio and image recording apparatus, for example, link information of image data for arbitrary audio data is edited and is then recorded in the computer. If the computer can execute the above-mentioned editing operations, it is efficient.

According to a technique disclosed in Japanese Unexamined Patent Application Publication No. 6-251079, a dedicated index data file is provided separately from files for audio data and image data, and link information between audio data and image data is recorded in the dedicated index data file. Accordingly, for example, if predetermined audio data or image data is deleted, the link information, recorded in the index data file, becomes inconsistent and so on. This is a problem.

Further, to maintain the link information after the movement of the audio data and the image data to another recording medium, the index data file has to also be moved. This is also a problem.

According to the technique disclosed in Japanese Unexamined Patent Application Publication No. 6-251079, index data has to be processed in addition to audio data and image data, resulting in complicated processing.

BRIEF SUMMARY OF THE INVENTION

In brief, according to the present invention, a data editing apparatus includes: a first folder to store audio data and image data, which is linked with the audio data at a predetermined playback position thereof; a second folder to store only image data without storing any audio data; a link release control unit for releasing a link between arbitrary audio data and image data linked therewith stored in the first folder; and a movement control unit for moving image data, of which link information is canceled, from the first folder to the second folder when the link is released through the link release control unit.

Additional features and advantages of the invention will be set forth in the description which follows, and in part will be obvious from the description, or may be learned by practice of the invention. The features and advantages of the invention may be realized and obtained by means of the instrumentalities and combinations particularly pointed out hereinafter.

BRIEF DESCRIPTION OF THE DRAWINGS

FIG. 7 is a flowchart showing a subroutine of a link addition process among processes executed by the operation of the data editing program installed in the data editing apparatus in FIG. 1;

FIG. 8 is a flowchart showing a subroutine as a link cancel process among the processes executed by the operation of the data editing program installed in the data editing apparatus in FIG. 1; and FIG. 9 is a flowchart showing a subroutine as a linked-image deletion process among the processes executed by the operation of the data editing program installed in the data editing apparatus in FIG. 1.

DETAILED DESCRIPTION OF THE PREFERRED EMBODIMENTS

An embodiment of the present invention will now be described with reference to the drawings.

Figure 1:
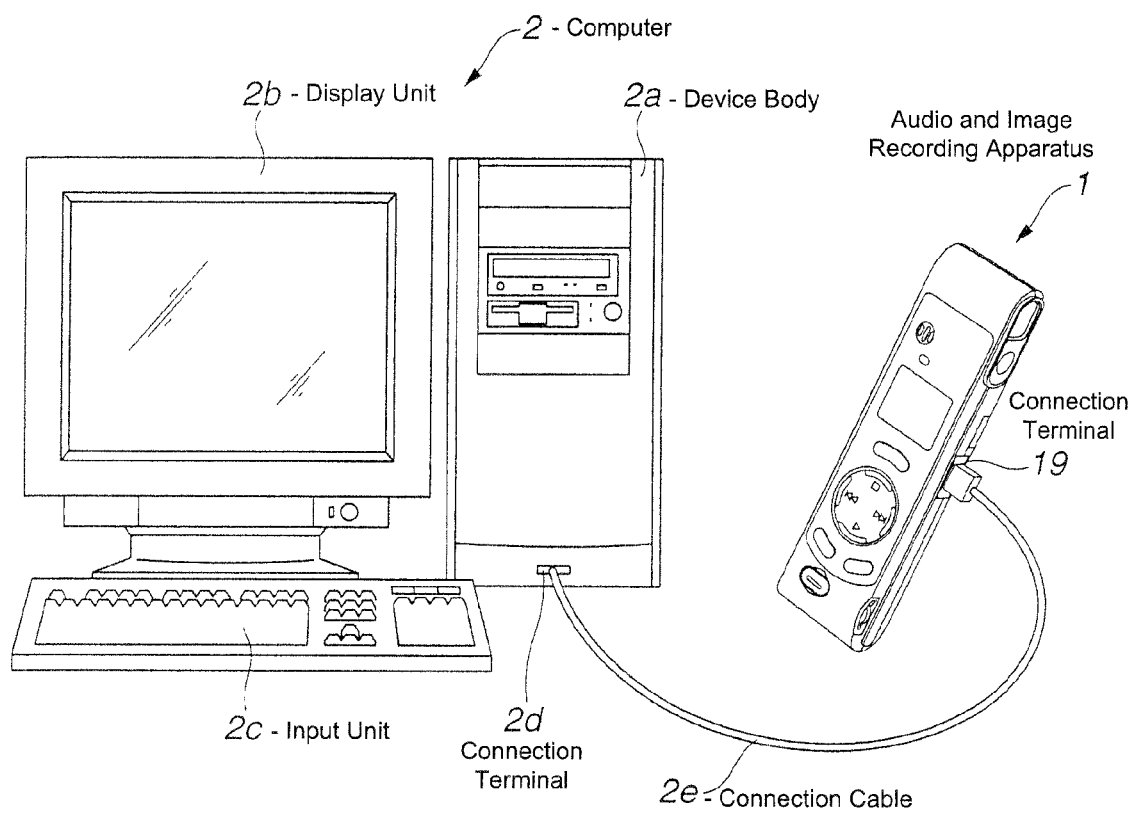
FIG. 1 is a diagram showing a data editing apparatus according to an embodiment of the present invention and an audio and image recording apparatus connected thereto.

FIG. 1 is a diagram showing a data editing apparatus according to the embodiment of the present invention and an audio and image recording apparatus connected thereto.

According to the present embodiment, as shown in FIG. 1, a data editing apparatus 2 comprises a device body 2a, a display unit 2b, and an input unit 2c. For example, a commonly used small information processing apparatus (small-scale computer) is used. In the following description, therefore, the data editing apparatus 2 is simply referred to as a computer 2.

In other words, the device body 2a of the computer 2 comprises various devices which control the whole computer 2 and are connected thereto, namely, various devices or the like including a recording medium such as an HDD (hard disk drive), and a plurality of circuit boards having thereon control circuits including an MPU (microprocessing unit) and the like for processing electric signals received from and transmitted to those various devices.

The device body 2a has a connection terminal 2d to which an audio and image recording apparatus 1 such as a portable digital recorder is connected. A USB terminal based on the USB (universal serial bus) standard is, for example, used as the connection terminal 2d. The USB standard is one of serial interface standards. One end of a detachable connection cable 2e is connected to the connection terminal 2d.

On the other hand, a similar connection terminal 19 based on the above-mentioned standard is also provided for the audio and image recording apparatus 1. The other end of the detachable connection cable 2e is connected to the connection terminal 19. Accordingly, when the computer 2 is electrically connected to the audio and image recording apparatus 1 through the connection cable 2e, both the apparatuses can communicate with each other.

For the computer 2, FIG. 1 illustrates what is called a stationary (desktop) computer. The type of computer is not limited to that illustration. For instance, a laptop or notebook computer can also be used. In other words, a generally widespread small-scale computer can be used in the same manner.

The present embodiment is explained by citing the example of the portable digital recorder as the audio and image recording apparatus 1. The example is not limited to the portable digital recorder. Another type of audio and image recording apparatus may also be used.

The audio and image recording apparatus connected to the data editing apparatus (computer) according to the present embodiment will now be described in detail hereinbelow with reference to FIGS. 2 to 4.

Figure 2:
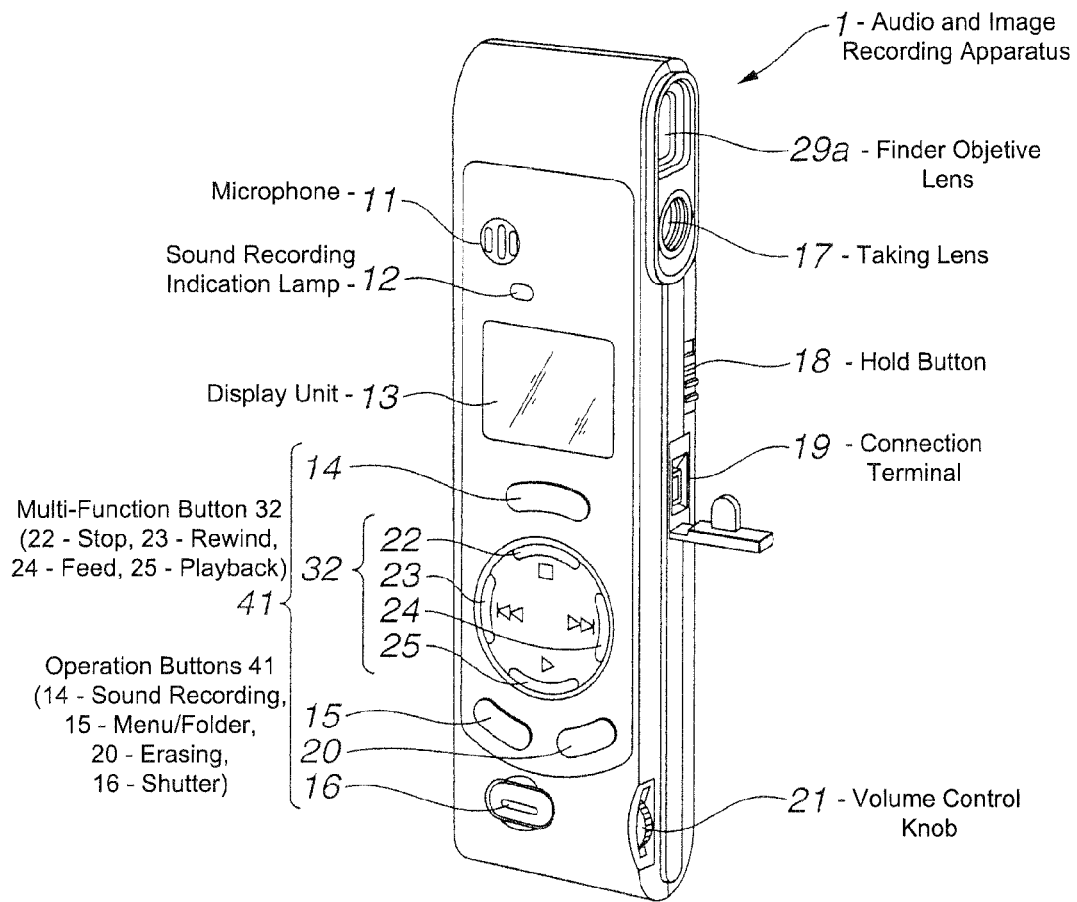
FIG. 2 is an external perspective view of the audio and image recording apparatus connected to the data editing apparatus in FIG. 1, FIG. 2 mainly showing the operation surface thereof.
Figure 3:
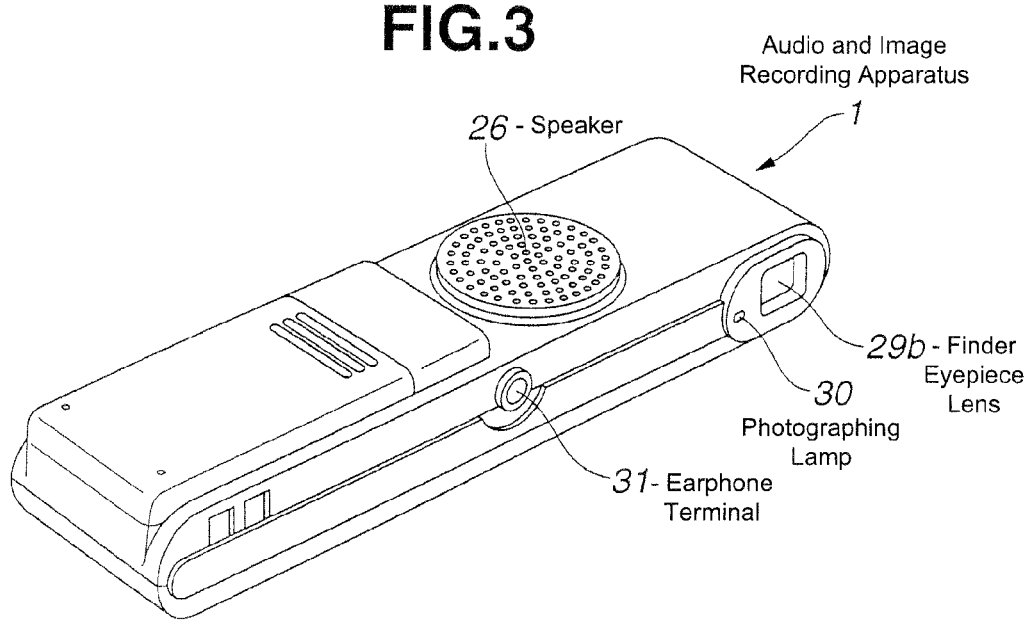
FIG. 3 is an external perspective view of the audio and image recording apparatus connected to the data editing apparatus in FIG. 1, FIG. 3 mainly showing the rear surface thereof.
Figure 4:
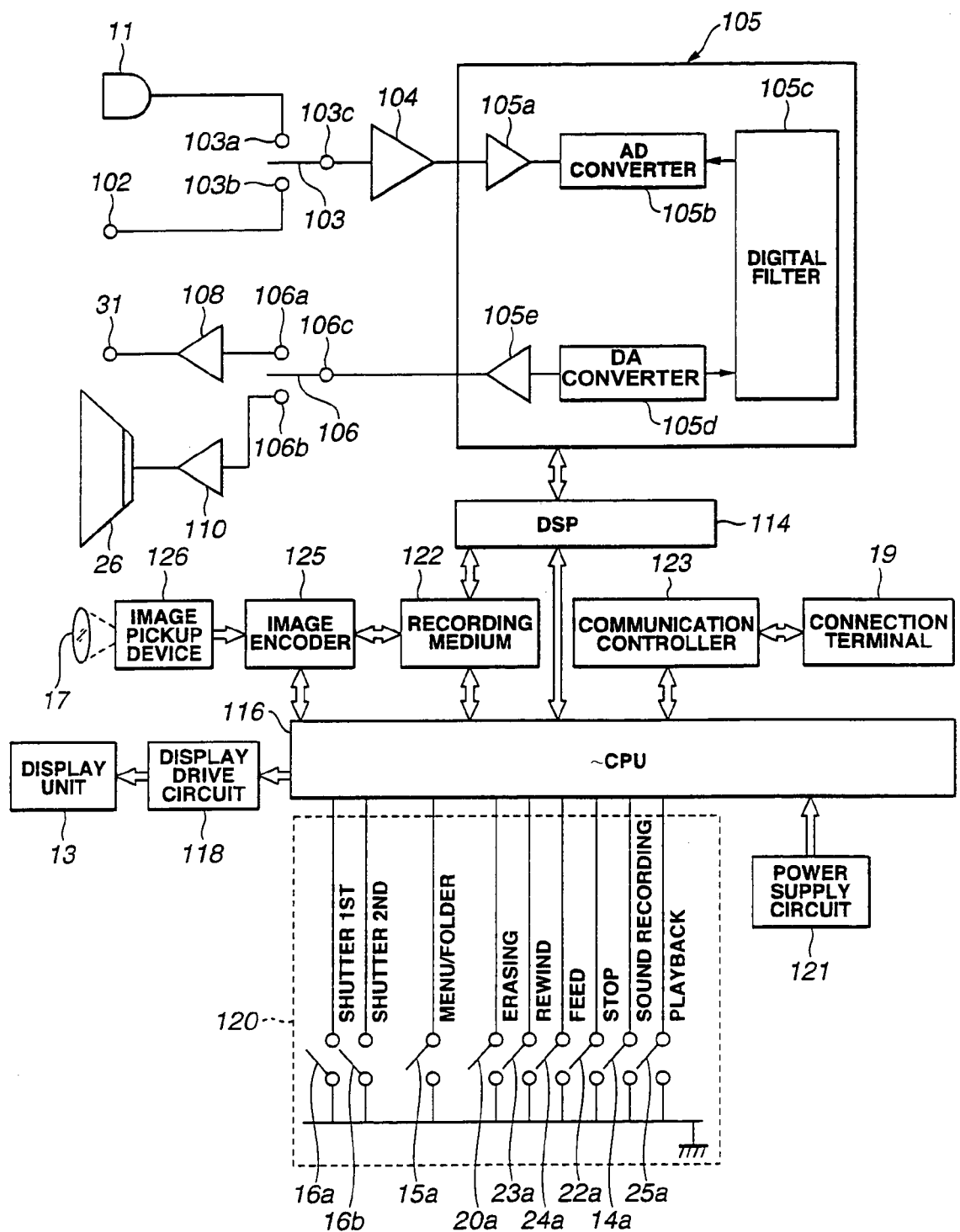
FIG. 4 is a block diagram schematically showing the internal structure of the audio and image recording apparatus in FIG. 1.

FIGS. 2 and 3 are external perspective views of the audio and image recording apparatus connected to the data editing apparatus (computer) according to the present embodiment. FIG. 2 mainly shows the operation surface of the audio and image recording apparatus. FIG. 3 mainly shows the rear surface of the audio and image recording apparatus. FIG. 4 is a block diagram schematically showing the internal structure of the audio and image recording apparatus.

As the audio and image recording apparatus 1, for example, the portable digital recorder is used as mentioned above. Referring to FIGS. 2 and 3, on the external surface as the operation surface of the audio and image recording apparatus 1, a group of operation buttons 41 to realize various functions, an information display unit 13 which comprises a liquid crystal display (LCD) or the like and displays a set-out mode of the audio and image recording apparatus 1, a sound recording indication lamp 12 which comprises a light emitting diode (LED) or the like and lights up upon sound recording to indicate that it is in a sound recording mode, a microphone 11 for obtaining sound, a volume control knob 21 for controlling volume when obtained audio data is played back, a taking lens 17 which comprises a plurality of optical lenses and the like and forms an image (subject image) of a matter (subject) to be obtained as image data at a predetermined position, a finder objective lens 29a and a finder eyepiece lens 29b which are included in a finder device for observing a range which includes a desired subject and which can be photographed, a photographing lamp 30 which is arranged near the finder eyepiece 29b and lights up or blinks to indicate a photographing mode, a hold button 18 serving as an operation member for preventing an incorrect operation and also functioning as an operation member for switching between turn-on and turn-off of a main power supply, a connection terminal 19 for communication with the computer 2 (refer to FIG. 1), a speaker 26 for playing back audio data obtained, and an earphone jack 31 or the like to which an earphone (not shown) for similarly playing back audio data obtained is connected are arranged at respective predetermined positions.

The group of operation buttons 41 includes the following buttons:

a sound recording button 14 which is operated when audio data recording is started;

a menu/folder button 15 which is operated upon calling up a menu screen to perform various settings such as setting of year, month, and date and switching between sound recording modes in the audio and image recording apparatus 1, or upon selecting and specifying a storage area (folder) for audio data and upon performing something else;

a shutter button 16 which is operated upon recording image data;

an erasing button 20 which is operated upon erasing recorded audio or image data; and a multi-function button 32 which is operated upon performing various file operations or various settings.

When the menu/folder button 15 is pressed for a predetermined time or longer (for example, one second or longer), the menu screen is called up. On the other hand, when the button 15 is pressed for a short time (for example, a period shorter than one second), the folder switching operation is executed.

The shutter button 16 is an operation member corresponding to a two-position switch just like a shutter button of a general camera and the like. When the shutter button 16 is pressed to a first position, photometry is executed. When the shutter button 16 is pressed to a second position, a shutter is driven to perform exposure (photographing operation).

The multi-function button 32 is an operation member constructed such that a plurality of functions can be controlled by a single member. The multi-function button 32 includes:

a stop button 22 serving as a portion which is operated upon stopping the playback operation or the sound recording operation;

a rewind button 23 functioning as an operation member which is operated when a playback position is changed during the playback operation and serving as a portion for moving the playback position backward from the current point in time;

a feed button 24 functioning as an operation member which is operated when the playback position is changed during the playback operation and serving as a portion for moving the playback position forward from the current point in time; and a playback button 25 serving as a portion which is operated upon starting the playback operation.

The four portions (buttons 22 to 25) of the multi-function button 32 execute different functions depending on the operation mode of the audio and image recording apparatus 1. For example, the four portions of the multi-function button are appropriately operated in such a case that an internal clock of the audio and image recording apparatus 1 is set.

The internal structure of the audio and image recording apparatus 1 will now be described with reference to the block diagram of FIG. 4.

The audio and image recording apparatus 1 comprises: the microphone 11 constituting an audio electric signal converter which collects sound and converts the sound into audio electric signals; a line input terminal 102 (not shown in FIGS. 1 to 3) which is connected to a connection cable or the like used for sound input to supply sound to the audio and image recording apparatus 1; a preamplifier 104 constituting a signal amplifier which receives audio signals supplied through the microphone 11 or the line input terminal 102 to amplify the signals to the optimum input level; an input switch (SW) 103 to determine which audio signals from the microphone 11 or from the line input terminal 102 should be supplied to the preamplifier 104; an audio codec 105 which receives audio signals from either the preamplifier 104 or a digital signal processor (hereinbelow, abbreviated to a DSP) 114, which will be described later, and performs predetermined signal conversion and filtering of the audio signals and performing something; an output switch (SW) 106 to switch between output destinations of the audio signals (analog signals) output from the audio codec 105; an earphone amplifier 108 which amplifies the audio signals supplied through the output switch (SW) 106 to the optimum signals to be generated through an earphone (not shown); the earphone terminal 31 serving as connection means which connects the earphone (not shown) to the audio and image recording apparatus 1; a speaker amplifier 110 which amplifies the audio signals supplied through the output switch (SW) 106 to the optimum signals to be generated through the speaker 26; the speaker 26 which receives the audio signals output from the speaker amplifier 110 to generate sound; the DSP 114 which performs digital signal processing, for example, when receiving output signals (digital signals) from the audio codec 105, performs compression coding (encoding) to the received signals, and when receiving output signals supplied from a CPU 116, which will be described later, performs decompression (decoding) to the received signals; control means 116 (hereinbelow, referred to as a CPU 116) comprising a CPU (central processing unit) which controls the entire audio and image recording apparatus 1; a power supply circuit 121 which supplies power to the CPU 116; a group of operation switches (SW) 120 comprising a plurality of operation switches which are operatively associated with the foregoing the group of operation buttons 41 to generate various instruction signals and transfer the signals to the CPU 116; the connection terminal 19 which is connected to the connection cable 2e to communicate with the computer 2 (refer to FIG. 1); a communication controller 123 which is arranged between the connection terminal 19 and the CPU 116, and controls the communication between the audio and image recording apparatus 1 and the computer 2 to transfer data in accordance with an instruction of the CPU 116; the information display unit (simply referred to the display unit in FIG. 4) 13 comprising a display screen to display predetermined information regarding the audio and image recording apparatus 1; a display drive circuit 118 which drives the information display unit 13 on the basis of an instruction signal of the CPU 116; the taking lens 17 which focuses a luminous flux from a subject; an image pickup device 126 which is capable of receiving an optical image including the subject, the image being formed by the luminous flux passing through the taking lens 17, and performing photoelectric conversion to convert the optical image into electric signals, the image pickup device 126 comprising, for example, charge coupled devices (CCDS) or complementary metal-oxide semiconductor; an image encoder 125 which receives the electric signals (image signals) formed through the photoelectric conversion by the image pickup device 126 and performs various predetermined image signal processings to the electric signals; and a recording medium 122 comprising a semiconductor device or the like in which image data is recorded in a predetermined area, the image data being obtained by converting the electric signals into the optimum recording form through the processings in the image encoder 125, and the like.

The group of operation switches (SW) 120 is electrically connected to the CPU 116. The CPU 116 performs predetermined control processes in response to various instruction signals from the group of operation switches (SW) 120. The group of operation switches (SW) 120 comprises a plurality of operation switches:

a sound recording switch 14a which is operatively associated with the operation of the sound recording button 14 to generate an instruction signal to instruct sound recording;

a menu/folder switch 15a which is operatively associated with the operation of the menu/folder button 15 to generate a menu change instruction signal or a folder change instruction signal;

a two-position switch comprising a first shutter switch (shutter 1st switch) 16a, which is operatively associated with the operation of the shutter button 16 in the first position to generate a photometric instruction signal, and a second shutter switch (shutter 2nd switch) 16b, which is operatively associated with the operation of the shutter button 16 in the second position to generate an exposure instruction signal (shutter release signal);

an erasing switch 20a which is operatively associated with the operation of the erasing button 20 to generate an instruction signal to erase a file;

a stop switch 22a which is operatively associated with the operation of the stop button 22 to generate an instruction signal to stop the operation;

a rewind switch 23a which is operatively associated with the operation of the rewind button 23 to generate a predetermined instruction signal such as a signal to instruct a backward change of a playback position;

a feed switch 24a which is operatively associated with the operation of the feed button 24 to generate a predetermined instruction signal such as a signal to instruct a forward change of the playback position; and a playback switch 25a which is operatively associated with the operation of a playback button 25 to generate an instruction signal to start playback.

As mentioned above, audio signals generated from either the microphone 11 or the line input terminal 102 are selectively supplied to the preamplifier 104 through the input switch (SW) 103. In a normal condition, the input switch (SW) 103 is connected to the microphone 11. In other words, audio signals are supplied from the microphone 11 to the preamplifier 104. In that condition, when an external microphone or a connection cable for sound input is connected to the line input terminal 102, the input switch (SW) 103 is connected to the line input terminal 102. Thus, audio signals are supplied from the line input terminal 102 to the preamplifier 104.

An audio codec 105 comprises an input amplifier 105a, an analog-digital (AD) converter 105b; a digital filter 105c; a digital-analog (DA) converter 105d; an output amplifier 105e; and the like.

As mentioned above, an analog audio signal generated from the audio codec 105 is selectively supplied to either an earphone amplifier 108 or a speaker amplifier 110 through an output switch (SW) 106. In the normal condition, the output switch (SW) 106 is connected to the speaker amplifier 110. In other words, audio signals generated from the audio codec 105 are supplied to a speaker 26 through the speaker amplifier 110 and are then generated as sound by the speaker 26. In that condition, when a connection terminal (not shown) of the earphone is connected to an earphone terminal 31, the output switch (SW) 106 is connected to the earphone amplifier 108. Thus, the audio signals generated from the audio codec 105 are supplied to the earphone (not shown) through the earphone amplifier 108 and are then generated as sound through the earphone.

As mentioned above, the communication controller 123 is provided to mutually control the communication such as data transfer to and from the data editing apparatus 2 under the control of the CPU 116. The connection terminal 19 is connected to the communication controller 123. As shown in FIG. 1, the computer 2 and the like are connected to the connection terminal 19 via the predetermined connection cable 2e. Therefore, in the connection between the audio and image recording apparatus 1 and the computer 2 through the connection cable 2e, audio data and the like read from a DSP 114 or a recording medium 122 can be transmitted from the audio and image recording apparatus 1 to the computer 2 through a communication controller 123, a connection terminal 19, and a predetermined connection cable 2e. In the meantime, predetermined audio data and image data stored in the computer 2 can be transferred from the computer 2 to the audio and image recording apparatus 1.

Further, the information display unit 13 is connected to the CPU 116 through a display drive circuit 118. Therefore, in accordance with instruction signals from the group of operation switches (SW) 120, the system mode of the audio and image recording apparatus 1 or the like, the CPU 116 controls the display drive circuit 118 to display predetermined information, for example, various information such as a set operation mode or an operating condition of the audio and image recording apparatus 1, information regarding recorded audio data (information indicating sound recording time and recording date and time), an indication of year, month, date, and time based on a built-in clock, an indication of the remaining amount of a battery, an indication of the remaining amount of storage available of a memory, and a predetermined alarm indication on the display screen of the information display unit 13.

On the other hand, the taking lens 17 converges a luminous flux from the subject to form a subject image at a predetermined position. The subject image formed by the taking lens 17 is projected on an image pickup surface of the image pickup device 126, on which the photoelectric conversion is performed. Electric signals obtained by the photoelectric conversion through the image pickup device 126, namely, image signals indicating an image are generated to the image encoder 125, in which various predetermined image signal processes are performed. In the image encoder 125, image data obtained by converting the image signals into the optimum form for recording is generated to the recording medium 122 through the CPU 116 and is then recorded in a predetermined area of the recording medium 122.

For the image data recorded by the audio and image recording apparatus 1, image data according to a general image data file such as JPEG (Joint Photographic Experts Group) format or Bit Map format is used.

As mentioned above, audio data and image data to be recorded through the audio and image recording apparatus 1 are recorded as a plurality of data files in predetermined areas of the recording medium 122.

In this instance, audio data files and image data files recorded in the recording medium 122 are recorded so that they can be easily distinguished from each other.

Figure 5:
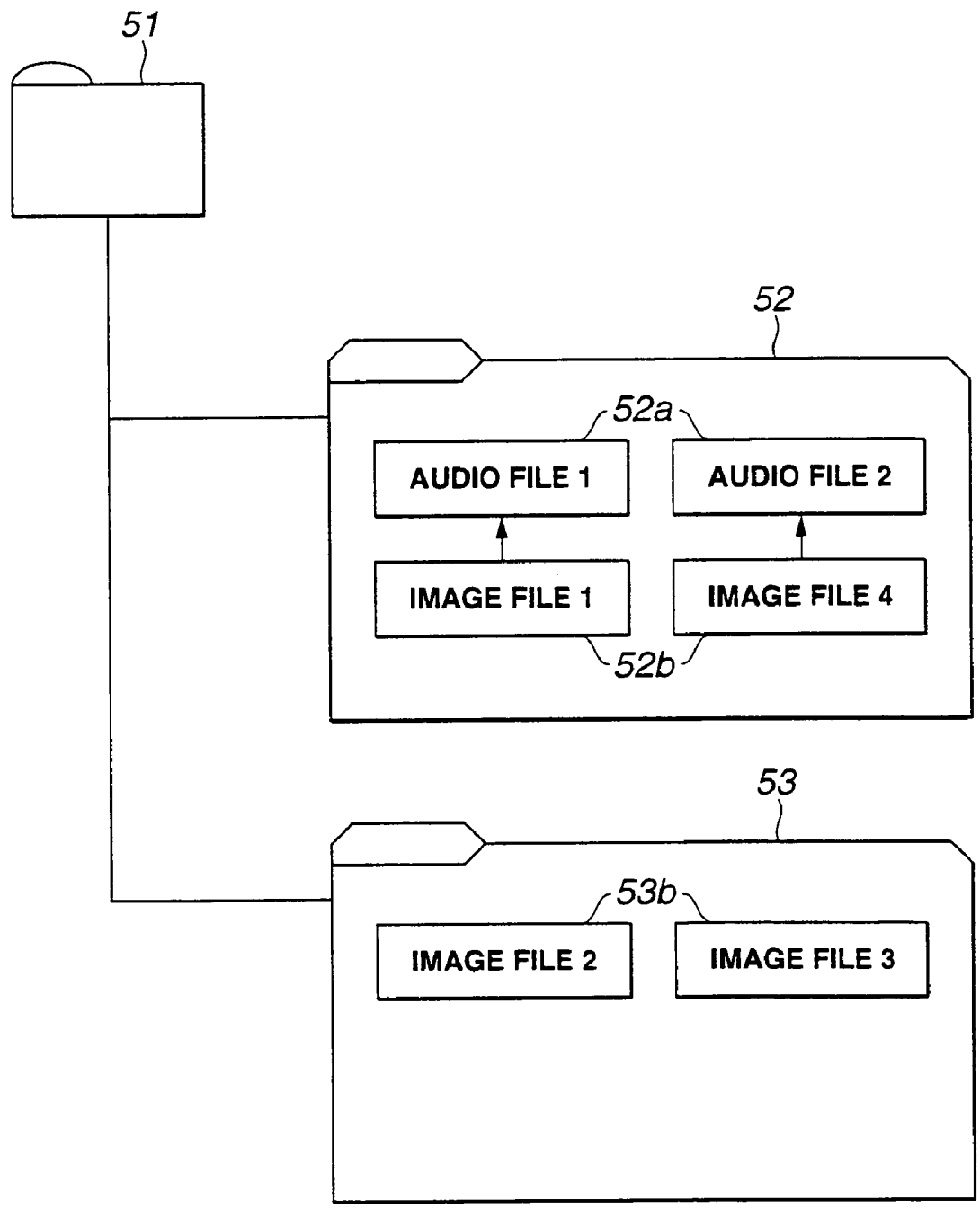
FIG. 5 is a diagram showing a recording pattern in recording areas in a recording medium included in the data editing apparatus in FIG. 1.

FIG. 5 is a diagram showing a recording pattern in recording areas in a recording medium included in the data editing apparatus according to the present embodiment.

In the recording medium (not shown) included in the data editing apparatus 2, as shown in FIG. 5, a data folder 51 is provided as a data recording area to record data files which can be processed through a data editing program according to the present embodiment.

A data folder 51 includes at least two data storage folders: an audio folder 52 as a first folder constituting a recording area to store an audio data file and an image data file linked with the audio data file; and an image folder 53 as a second folder constituting a recording area to store only image data file which is not linked with any audio data file. According to the above structure, a plurality of image data files to be recorded in the recording medium are recorded in the respective storage folders depending on whether the data file has link information with any audio data file. The files are managed every folder.

For the data storage folders, preferably, at least one folder is provided as the audio folder 52 and at least one folder is provided as the image folder 53. The number of folders is not limited to the above case. Many folders may be used. FIG. 5 illustrates the arrangement of one audio folder and one image folder.

Each data storage folder stores data files in the corresponding form. Each time a data file is obtained, the audio and image recording apparatus 1 assigns a file number to the data file. The file numbers assigned to the respective data files are continuously used.

In other words, for the image files in FIG. 5, "Image file 1" and "Image file 4" are stored in the audio folder 52 and "Image file 2" and "Image file 3" are stored in the image folder 53.

The audio and image recording apparatus 1 assigns file numbers to respective image data in order of time, namely, in order of photographing. Accordingly, the image files 1, 2, 3, and 4 have been photographed in that order. Among the four image files, "Image file 1" and "Image file 4" are linked with "Audio file 1" and "Audio file 2", respectively. Consequently, the two image files are stored in the audio folder 52. Since "Image file 2" and "Image file 3" are not linked with any audio data file, the files are stored in the image folder 53.

As mentioned above, image data files are stored in the different folders depending on whether the corresponding image data file is linked with any audio data file. Thus, image data files can be easily managed on the basis of link information.

As mentioned above, when audio and image data files to be recorded are obtained through the audio and image recording apparatus 1, link information between the audio data file and the image data file is recorded in a file header portion of each of the respective data files (the detailed structure of each data file will be described later).

The detailed structure of an audio data file and that of an image data file, which are recorded in the recording medium of the audio and image recording apparatus connected to the data editing apparatus according to the present embodiment, will now be described with reference to Tables 1 to 3. For the detailed structure of each data file, after each data file is transferred from the recording medium of the audio and image recording apparatus 1 to the recording medium of the data editing apparatus 2, the form of the data file is not changed. Therefore, the data editing apparatus 2 uses data having the same form as that of data used in the audio and image recording apparatus 1.

The audio data file is managed on the basis of the file header portion formed when the audio data file is recorded in the recording medium. The file header portion is defined in a 512-byte field (one sector).

The detailed structure of the audio data file will now be described with reference to Tables 1 and 2.

Referring to Table 1, in the file header portion of the audio data file, information indicating sound recording start date and time of the data file is recorded in, for example, a form of

TABLE 1

(Audio file)

| Sector | Address | Detail | Size | Format | |
|---|---|---|---|---|---|
| 1 | 0-5 | Sound recording start date and time (HHMMSS) | 6 | ASCII | |
| | 6 | Sound recording rate | 1 | Binary unsigned | |
| | 7-8 | ID information | 2 | Binary unsigned | |
| | 9-15 | Link file information 1 | 7 | Binary unsigned | Header |
| | 16-22 | Link file information 2 | 7 | Binary unsigned | portion |
| | . | . | . | | |
| | 352-358 | File link information 50 | 7 | Binary unsigned | |
| | 359-511 | (BLANK) | | | |
| 2-n | 512-X | Audio data | | | Data portion |

TABLE 2

(Link file information)

| Address | Detail | Size | Format |
|---|---|---|---|
| 0-1 | File No. | 2 | Binary unsigned |
| 2-3 | File ID information | 2 | Binary unsigned |
| 4-6 | Link position information (HMS) | 3 | Binary unsigned |

TABLE 3

(Image file)

| Sector | Address | Detail | Size | Format | |
|---|---|---|---|---|---|
| 1 | 0-5 | Photographing date and time (HHMMSS) | 6 | ASCII | |
| | 6-7 | ID information | 2 | Binary unsigned | |
| | 8 | Presence or absence of link | 1 | Binary unsigned | Header |
| | 9 | Link destination folder | 1 | Binary unsigned | portion |
| | 10-11 | Link destination file No. | 2 | Binary unsigned | |
| | 12-14 | Link position information (HMS) | 3 | Binary unsigned | |
| | 15-511 | (BLANK) | 497 | | |
| 2-n | 512-X | JPEG image | | | Data portion |

Table 1 shows the detailed structure of the audio data file including audio data which is dealt with by the data editing apparatus according to the present embodiment or the audio and image recording apparatus connected thereto. Table 2 shows the detailed structure of link file information as a part of a file header portion of the audio data file of Table 1. Table 3 shows the detailed structure of the image data file including image data which is dealt with by the data editing apparatus according to the present embodiment or the audio and image recording apparatus connected thereto.

"HHMMSS" in six bytes (addresses 0 to 5) from the top. In this case, "HH" indicates "hour" information, "MM" indicates "minute" information, and "SS" indicates "second" information.

In the subsequent byte (address 6), sound recording rate information regarding sound quality is recorded. In this instance, the sound recording rates includes, for example, a sound recording rate corresponding to high-quality recording based on "HQ mode", that corresponding to standard-quality recording based on "SP mode", and that corresponding to long-time (low-quality) recording based on "LP mode". A number, a code or the like corresponding to a predefined sound recording rate is indicated by one byte and is recorded. The recording mode can be changed in the menu screen which is called by the operation of the menu/folder button 15.

In the next two bytes (addresses 7 and 8), file ID information is recorded. The file ID information means a number information assigned to each file in the order in which data files are recorded in the recording medium 122, the number being assigned to each data without discriminating between audio data and image data.

In an area corresponding to the subsequent addresses (addresses 9 to 358), link file information of image data files linked with the audio data file is recorded. In this case, seven bytes are allocated to each link file information.

Specifically, referring to Table 2, each link file information comprises file number (No.) information of two bytes, file ID information of two bytes, and link (relation) position information (HMS) of three bytes. Namely, the link file information is composed of seven bytes.

The number of link file information to be recorded corresponds to that of image data files related to the audio data file. According to the present embodiment, 50 image data files can be linked with one audio data file at the maximum. In the file header portion, therefore, the area up to the predetermined address (address 358) is used to record the information.

The subsequent addresses (addresses 359 to 511) are blank (BLANK) in the present embodiment. However, other information may be recorded in an area corresponding to those addresses.

In an area corresponding to the subsequent address (address 512) in the audio data file, the audio data is recorded.

The detailed structure of the image data file will now be described with reference to Table 3.

In a file header portion of the image data file, referring to Table 3, information indicating photographing date and time of the data file is recorded in, for example, the same form of "HHMMSS" as that of the audio data file in six bytes (addresses 0 to 5) from the top.

In the subsequent two bytes (addresses 6 and 7), file ID information is recorded.

In the next byte (address 8), information indicating the presence or absence, which indicates whether the image data file is obtained while the audio data file is being recorded, namely, whether the image data file is obtained by photographing during the sound recording operation, that is, whether the image data file is linked with any audio data file, is recorded.

When "the presence" is recorded as information indicating the presence or absence of link, the subsequent six bytes (addresses 9 to 14) are used to record link information indicating which audio data file the image data file is linked with. If the information indicates "the absence", that area corresponding to the six bytes (addresses 9 to 14) is blank.

The link information will now be described in detail. Folder information of the linked audio data file, namely, link destination folder information is recorded in one byte (address 9). In the next two bytes (addresses 10 and 11), file number information of the linked audio data is recorded. In the subsequent three bytes (addresses 12 to 14), link position information indicating a position in the audio data file, at which the image data file is linked with the audio data file, is recorded.

In the file header portion, the subsequent addresses (addresses 15 to 511) are blank (BLANK) in the present embodiment. However, other information may be recorded in an area corresponding to those addresses.

In an area corresponding to the subsequent address (address 512) in the image data file, image data is recorded.

According to the above-mentioned structure, for example, when the file header portion of the image data file is referred, the corresponding audio data file and the corresponding link position information can be immediately obtained with reliability. In the meantime, by referring to the file header portion of the audio data file, the image data file linked with the audio data file can be easily and rapidly referred in the same manner.

In the audio and image recording apparatus 1, file information of respective data files recorded in the recording medium 122, namely, file information recorded in the file header portion can be displayed using the information display unit 13.

Audio data and image data are recorded in the recording medium 122 through the audio and image recording apparatus 1 as following manner: The audio and image recording apparatus 1 is connected to the data editing apparatus 2 in the arrangement shown in FIG. 1 to communicate with each other, so that the audio and image data can be transferred from the audio and image recording apparatus 1 to the data editing apparatus 2 and be then stored in the predetermined recording areas of the recording medium in the data editing apparatus 2.

For the respective data stored in the data editing apparatus 2, sound can be generated on the basis of the audio data using the speaker built in the device body 2a and an image based on the image data can be displayed on the display unit 2b. File information of the data can be arbitrarily edited.

For this purpose, a data editing program is installed in the data editing apparatus 2. The data editing program realizes a function of allowing the data editing apparatus 2 to communicate with the communication controller 123 of the audio and image recording apparatus 1 connected thereto to read out file information of each data file, which is recorded in the recording medium 122 of the audio and image recording apparatus 1, and then to transmit the read information to the recording medium in the data editing apparatus 2. The program also has a function of playing back each data and realizes a function of arbitrarily editing file information of the data.

The data editing program realizes the various functions for audio data and image data which are first obtained by the audio and image recording apparatus 1 and are transferred from the audio and image recording apparatus 1 to the data editing apparatus 2 and are then stored in the data editing apparatus 2. For the functions which can be realized through the data editing program, in addition to the above-mentioned functions of reading data files recorded in the recording medium 122 of the audio and image recording apparatus 1 in the data editing apparatus 2, storing the read data files into the storage medium of the data editing apparatus 2, and then editing the data files, for example, the data editing program further provides: a function of mutually transferring data files therebetween; a function of directly transmitting an output from the DSP 114 of the audio and image recording apparatus 1 to the data editing apparatus 2; and a function of directly transmitting a data file, compressed and recorded through the data editing apparatus 2, to the DSP 114 of the audio and image recording apparatus 1 to generate sound using the speaker 26 of the audio and image recording apparatus 1.

However, since the whole of the above-mentioned various functions are not directly concerned with the present invention, the detailed description thereof is omitted. Among the functions realized by the data editing program installed in the data editing apparatus 2, the function concerned with the present invention, namely, the function of editing file information (particularly, link information) between transferred audio and image data will now be described in detail hereinbelow.

As mentioned above, the data editing apparatus 2, having the data editing program according to the present embodiment, communicates with the communication controller 123 of the audio and image recording apparatus 1 connected thereto. Thus, an audio data file and an image data file, which have been recorded in the recording medium 122 of the audio and image recording apparatus 1, can be transferred to the data editing apparatus 2 and be stored therein. The data editing apparatus 2 can edit file information of each data stored therein.

Figure 6:
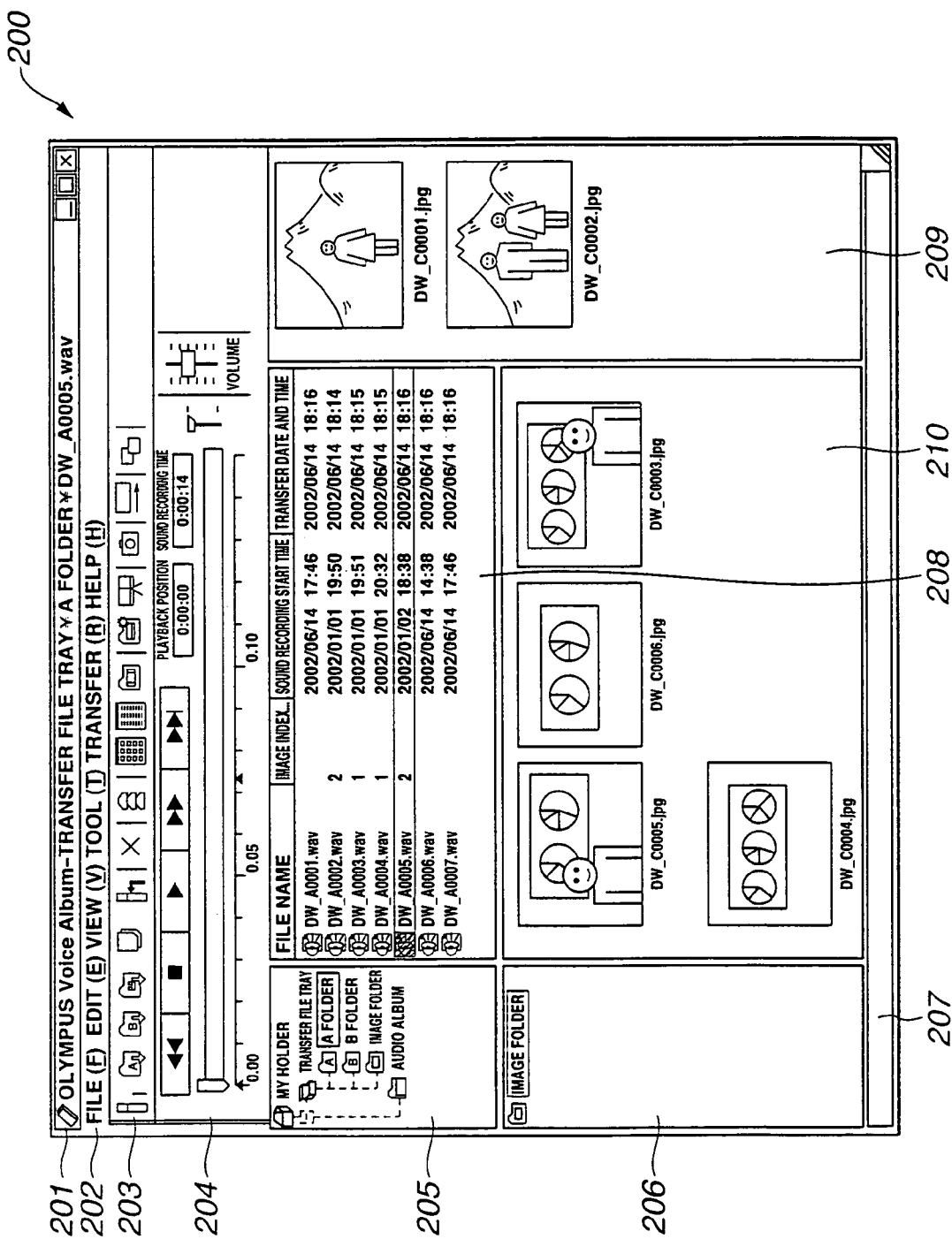
FIG. 6 is a diagram showing a display screen which appears when a data editing program installed in the data editing apparatus in FIG. 1 is started.

FIG. 6 shows a display screen which appears upon starting the data editing program installed in the data editing apparatus according to the present embodiment. On the display screen, the user simultaneously views audio data files stored in the data editing apparatus, image data files linked with one of the audio data files, and image data files independently obtained by photographing.

The data editing apparatus 2 is connected to the audio and image recording apparatus 1 as shown in FIG. 1 to transfer audio data and image data, which are recorded in the recording medium 122 of the audio and image recording apparatus 1, to the data editing apparatus 2. After that, when the data editing program installed in the data editing apparatus 2 is started, the display as shown in FIG. 6 is performed through the display unit 2b. When the user performs a predetermined operation on the display screen, he or she can refer to file information of each data file, which are obtained by the audio and image recording apparatus 1 and stored in the data editing apparatus 2.

Names of respective portions displayed through the data editing program on the display screen will now be described with reference to FIG. 6.

Referring to FIG. 6, an operation area and a display area to realize various functions are set in predetermined display areas on a screen 200. The display format of the screen 200 is based on a display form of a program (application software) installed in a small-scale computer which is in practical use and is generally widespread in recent years. The data editing program according to the present embodiment uses the same display form. The operation system is similar to that of the above program.

As mentioned above, FIG. 6 shows the display screen which displays a list of audio data files and list of image data files stored in the data editing apparatus 2.

Referring to FIG. 6, a name display area 201 to display the name of a program for information display is displayed in the uppermost portion of the screen 200. A menu display field 202 to display names of functions, which can be executed by the present data editing program, is displayed mainly using characters under the area 201. The function names displayed in the menu display field 202 include, for example, "File (F)", "Edit (E)", "View (V)", "Tool (T)", "Transfer (R)", "Help (H)", etc. as shown in FIG. 6. The user specifies (clicks on) an item using a pointing device such as a mouse. Alternatively, he or she inputs a predetermined character string using input means such as a keyboard. Thus, function names prepared in a lower layer of each item are displayed. Alternatively, the specified function is executed.

A tool display field 203 is displayed beneath the menu display field 202. In the tool display field 203, several functions, which may be often used, among the functions executed by the present data editing program are displayed as pictorial symbols (namely, icons). When the user clicks the pointing device or the like on a desired icon among the icons displayed in the tool display field 203, the function corresponding to the selected and specified icon can be immediately executed.

A playback operation display field 204 is displayed beneath the tool display field 203. In the playback operation display field 204, the amount of time of an audio data file previously selected is displayed in numerical notation using a time base (referred to as a playback time base). A playback position is displayed on the time base. If any image data is linked with the audio data, file information including position information is also displayed in a predetermined form on the time base. Further, an operation area used for the playback operation is displayed as buttons.

When the user performs a predetermined operation in the predetermined area in the playback operation display field 204 using the pointing device or the like, he or she can play back an audio data file selected from among the audio data files recorded in the present data editing apparatus 2 or can perform the file operation, for example, link an image data file with the audio data file.

Folder arrangement display area is arranged beneath the playback operation display field 204 on the left side of the screen 200. The upper area is a folder arrangement display area 205 to display the arrangement of folders including data files recorded in the data editing apparatus 2. The lower area is an image folder arrangement display area 206 to display an image folder to store only image data which are not linked with any audio data, from among data files recorded in the data editing apparatus 2.

According to the present embodiment, as shown in the folder arrangement display area 205 in FIG. 6, two audio folders (A, B) and one image folder are arranged.

Beneath the playback operation display field 204, file list display area to display the detailed contents of folders selected from the folder arrangement display areas 205 and 206, namely, lists of data file names are vertically displayed in substantially the middle of the screen 200.

The upper area is a file list display area 208 and the lower area is an image file list display area 210. In the file list display area 208, the detailed list of the folder selected from the folder arrangement display area 205 is displayed. In the image file list display area 210, the detailed list of the folder selected in the image folder arrangement display area 206 is displayed. In FIG. 6, as the detailed list displayed in the image folder arrangement display area 206, file names and the corresponding reduced images (thumbnail images) are arranged. Except for that mentioned above, file names and the corresponding file information indicating photographing date and time can also be displayed as a list in a text format.

A desired data file is selected from among the data files displayed in each of the file list display areas 208 and 210 using the pointing device or the like and, after that, the data file can be displayed, played back, edited, or the like.

Beneath the playback operation display field 204, a linked-image display area 209 is displayed on the right side of the screen 200, when an audio data file is selected from the above-mentioned file list display area 208. In the linked-image display area 209, names of image data files linked with the selected audio data file and the corresponding reduced images (thumbnail images) are displayed as a list. In the lowermost portion of the screen 200, a mode display field 207 is displayed.

In such a state shown in FIG. 6, an audio folder A is selected from the two audio folders as shown in the folder arrangement display area 205. An audio data file having a file name "DW_A0005.WAV" is selected among audio data files stored in the selected audio folder A as shown in the file list display area 208. Two image data "DW_C0001.jpg" and "DW_C0002.jpg", linked with the audio data file "DW_A0005.WAV", are displayed as reduced images in the linked-image display area 209.

In that state, the image folder is selected as shown in the image folder arrangement display area 206. File names of image data files stored in the selected image folder and the corresponding reduced images are displayed in the image file list display area 210.

As mentioned above, among image data files recorded in the data editing apparatus 2, only images corresponding to image data files, which are independently obtained by photographing with no link with any audio data file, are displayed in the image file list display area 210.

The operation of the data editing apparatus according to the present embodiment with the above structure will now be described hereinbelow.

As mentioned above, the present data editing apparatus 2 operates on the basis of the data editing program installed in the data editing apparatus 2 and can realize various functions by the operation of the user.

FIGS. 7, 8, and 9 are flowcharts each showing a process among processes executed by the operation of the data editing program installed in the data editing apparatus according to the present embodiment. FIG. 7 shows a subroutine as a link addition process performed when a desired image data file is linked with an arbitrary audio data file stored in the data editing apparatus. FIG. 8 shows a subroutine as a link cancel process performed upon canceling (releasing) a link between an image data file and an arbitrary audio data file stored in the data editing apparatus. FIG. 9 shows a subroutine as a linked-image deletion process performed upon deleting an arbitrary image data file stored in the data editing apparatus.

The subroutine (refer to FIG. 7) as the link addition process executed by the data editing program will now be described hereinbelow.

On the display screen shown in FIG. 6, the user selects an audio folder including a target audio data file to be subjected to link addition from the folder arrangement display area 205 using the pointing device and then selects the target audio data file in the file list display area 208. Subsequently, the user selects the image folder in the image folder arrangement display area 206.

In this state, among a plurality of reduced images displayed in the image file list display area 210, namely, thumbnail images based on image data which is not linked with any audio data, a thumbnail image corresponding desired image data to be linked is dragged and dropped in a predetermined display area, thus executing the subroutine as the link addition process of FIG. 7.

In this instance, drag-and-drop is one of operations for general computers and denotes a manner of realizing a desired function using a pointing device or an input device such as a keyboard. Specifically, the following series of manipulations is performed: The pointing device is controlled to move a pointer (indication which is operatively associated with the operation of the pointing device), which is displayed on the display screen, over a target. A predetermined button of the pointing device is then pressed. While the button is being pressed, the pointing device is controlled to move the pointer to a desired position on the display screen. After that, the pressed button is released at the desired position.

For the drag-and-drop operation to execute the link addition subroutine, a reduced image displayed in the image file list display area 210 can be dragged and dropped in a desired position on, for example, the playback time base in the playback operation display field 204.

Alternatively, the reduced image can also be dragged and dropped in a desired position in the linked-image display area 209. In this case, link position information is specified in the desired position (drop position).

Except for that mentioned above, a predetermined operation menu is selected in the menu display field 202 or the tool display field 203, so that the similar effect can be derived. In this case, link position information is specified in "the current playback position (position at which the clicking operation is performed in a sound playback mode, or a stop position in a playback stop mode)".

After the link addition subroutine is started as mentioned above, in step S1 of FIG. 7, a file name of an audio data file as a link destination and information indicating a desired link position are obtained. The process proceeds to step S2.

In step S2, the link information obtained in step S1 mentioned above is added to a predetermined address in a file header portion of the audio data file as the link destination. Then, the process proceeds to step S3.

In step S3, a desired image data file to be linked is moved from the image folder to the audio folder in which the audio data file to be linked with the image data is stored. After that, the process proceeds to step S4. The above file moving process includes a series of steps of copying a data file to be moved to a target folder and then deleting the original data file in the source folder.

In step S4, the corresponding link information is written in a predetermined address in a file header portion of the linked image data file. The process proceeds to step S5.

In step S5, the display screen shown in FIG. 7 is updated and, after that, the above-mentioned series of steps is terminated (returned).

The link cancel subroutine (refer to FIG. 8) executed by the data editing program will now be described hereinbelow.

In this case, the user selects an audio folder, which includes a target audio data file to be subjected to link cancel, from the folder arrangement display area 205 on the display screen shown in FIG. 6 using the pointing device. The user then selects the target audio data file from the file list display area 208.

In this state, among reduced images displayed in the linked-image display area 209, namely, thumbnail images of images based on image data linked with the selected audio data file, the user selects a thumbnail image corresponding to image data, to which the user desires to perform link cancel, by the click operation of the pointing device (pressing a predetermined button of the pointing device).

In this instance, when the user further performs a predetermined click operation, for example, clicks a right button of the pointing device, a submenu to cancel a linked image is displayed. The user selects a menu item. Alternatively, the user selects from a predetermined operation menu in the menu display field 202 or the tool display field 203, so that the similar effect can be derived. Thus, the link cancel subroutine of FIG. 8 is executed.

After the link cancel subroutine is started, in step S11 of FIG. 8, a control circuit of the data editing apparatus 2 deletes link information of an audio data file as a link destination. Consequently, a link between the selected audio data and arbitrary image data is released. After that, the process proceeds to step S12.

In this instance, the control circuit of the data editing apparatus 2 functions as link release means for releasing a link between arbitrary audio data stored in an audio folder (first folder) and image data linked therewith.

In step S12, the control circuit of the data editing apparatus 2 moves the image data file, in which the link is canceled, to the image folder. The process proceeds to step S13. In this case, the file moving process also includes a series of steps of copying a data file to be moved to a target folder and then deleting the original data file in the source folder.

The control circuit of the data editing apparatus 2 functions as moving means for moving image data, of which link information is canceled, from an audio folder (first folder) to an image folder (second folder).

In step S12, in the movement of image data, of which link information is canceled, from the audio folder (first folder) to the image folder (second folder), if the same data as the image data to be moved, namely, the image data of which link information is deleted in step S11 mentioned above is included in the image folder (second folder), the file moving process is inhibited. Therefore, the control circuit of the data editing apparatus 2 functions as inhibiting means for inhibiting file movement.

In step S13, information indicating the presence or absence of link is deleted in the file header portion of the image data file. In other words, header information is rewritten so as to indicate the absence of link. Then, the process proceeds to step S14.

In step S14, the display screen shown in FIG. 8 is updated. After that, the above series of steps is terminated (returned).

The linked-image deletion subroutine (refer to FIG. 9) executed by the data editing program will now be described hereinbelow.

In this case, the user selects an audio folder including a target audio data file to be subjected to link cancel from the folder arrangement display area 205 on the display screen shown in FIG. 6 using the pointing device. The user then selects the target audio data file in the file list display area 208.

In this state, among reduced images displayed in the linked-image display area 209, namely, thumbnail images of images based on image data linked with the selected audio data file, the user selects a thumbnail image corresponding to image data, which the user desires to delete, by the click operation of the pointing device (pressing a predetermined button of the pointing device).

In this instance, when the user further performs a predetermined click operation, for example, clicks the right button of the pointing device, a submenu to delete a linked image is displayed. The user selects the linked image to be deleted from the submenu. Alternatively, the user selects from a predetermined operation menu in the menu display field 202 or the tool display field 203, so that the similar effect can be derived. Thus, the linked-image deletion subroutine of FIG. 9 is executed.

After the linked-image deletion subroutine is started, in step S21 of FIG. 9, link information (link file information) of an audio data file as a link destination is deleted. Then, the process proceeds to step S22.

In step S22, a linked image data file itself is deleted. The process proceeds to step S23.

In step S23, the display screen shown in FIG. 9 is updated. Then, the above-mentioned series of steps is terminated (returned).

According to the present embodiment, in the link addition process of FIG. 7, the image data file to be linked is copied to the audio folder in which the audio data file as the link destination is stored and, after that, the original image data file in the source folder is deleted. That measure is taken for the user to intuitively and easily understand the process.

As another measure, in the link addition process, for example, the linked image data file which is original is not deleted in the above-mentioned source folder. In this instance, in the link addition process, only copying the linked image data file into the audio folder, in which the audio data file as the link destination is stored, is performed.

Therefore, the linked image data file is remained in the image folder. Thus, the link addition process can be performed so that the same image data file is further linked with another audio data file. In other words, the same image data file can be linked with a plurality of audio data files.

As mentioned above, according to the embodiment, the operation regarding the link between the audio data file and the image data file, namely, file information editing operations such as link addition, link cancel, and link deletion can be remarkably easily performed on the display screen of the data editing apparatus 2. Since the user can perform the operation while visually observing the display screen, good operationality can be provided with reliability.

As mentioned above, the present invention provides a data editing apparatus capable of making an audio and image recording apparatus transfer audio data and image data, obtained through the audio and image recording apparatus, to the data editing apparatus itself, storing the data therein, and then editing link information of each of the audio data and the image data, and a data editing program which is used in the data editing apparatus and can realize the functions thereof.

The present invention includes a modification and a variation obtained by partially combining the above-mentioned embodiment.

In this invention, it is apparent that working modes different in a wide range can be formed on this basis of this invention without departing from the spirit and scope of the invention. This invention is not restricted by any specific embodiment except being limited by the appended claims.

What is claimed is:

1. A data editing apparatus comprising:
   a recording medium, including: (i) a first folder to store audio data and image data that is linked to a playback position of the audio data, and (ii) a second folder to store only image data and no audio data;
   link release means for canceling the link between the audio data and the image data linked therewith which are stored in the first folder;
   moving means for automatically moving the image data, from which the link is canceled, from the first folder to the second folder when the link is canceled by the link release means, such that the image data from which the link is canceled is no longer stored in the first folder; and
   wherein when canceling the link, the link release means rewrites header information of the audio data and rewrites header information of the image data to cancel the link between the audio data and the image data.

2. The apparatus according to claim 1, further comprising:
   inhibiting means for inhibiting the movement of the image data, from which the link is canceled, if the same image data as the image data to be moved is already stored in the second folder.

3. The data editing apparatus according to claim 1, further comprising:
   audio data selecting means for selecting a target audio data to be subjected to link addition in an audio data list display area;
   means for selecting image data to be linked with the selected audio data from among the image data stored in the second folder;
   means for linking the selected audio data with the selected image data and copying the linked selected audio data and selected image data to the first folder; and
   means for, after the copying of the linked selected audio data and selected image data to the first folder, deleting the selected image data from the second folder.

4. The apparatus according to claim 1, further comprising:
   display means for displaying an editing window that includes a first display area for displaying a list of audio data stored in the first folder such that the audio data is selectable, a second display area for displaying a list of image data stored in the second folder, and a third display area for displaying a list of image data that is linked to audio data that has been selected from the list of audio data displayed in the first display area, wherein the link release means cancels the link between the audio data and the image data linked therewith which are stored in the first folder, in response to an operation on the editing window.

5. A computer recording medium having a data editing program stored thereon which is executable by a computer to cause the computer to edit audio data and image data linked to a playback position of the audio data, wherein the audio data and the image data linked thereto are stored in a first folder in a memory of the computer, the program being executable by the computer to cause the computer to execute functions comprising:

canceling the link between the audio data and the corresponding image data stored in the first folder;

automatically moving the image data, from which the link is canceled, from the first folder to a second folder in the memory of the computer when the link is canceled, such that the image data from which the link is canceled is no longer stored in the first folder;

wherein only image data, which is not linked to the audio data in the first folder, and no audio data, is stored in the second folder; and wherein canceling the link comprises rewriting header information of the audio data and rewriting header information of the image data to cancel the link between the audio data and the image data.

6. A computer recording medium having a data editing program stored thereon which is executable by a computer to cause the computer to edit audio data and image data linked to a playback position of the audio data, the program being executable by the computer to cause the computer to execute functions comprising:

displaying on a display of the computer an editing window that includes: (i) a first display area for displaying a list of audio data that is stored in a first folder in a memory of the computer, such that the audio data is selectable, (ii) a second display area for displaying a list of image data that is not linked to the audio data, the image data that is not linked to the audio data being stored in a second folder in the memory that is different from the first folder, and (iii) a third display area for displaying a list of image data that is linked to audio data that has been selected from the list of audio data displayed in the first display area, the image data that is linked to the audio data being stored in the first folder;

canceling the link between the audio data and the corresponding image data stored in the first folder, in response to an operation on the editing window;

automatically moving the image data, from which the link is canceled, from the first folder to the second folder when the link is canceled; and wherein canceling the link comprises rewriting header information of the audio data and rewriting header information of the image data to cancel the link between the audio data and the image data.

* * * * *